US009209512B2

(12) United States Patent
Cheng et al.

(10) Patent No.: US 9,209,512 B2
(45) Date of Patent: Dec. 8, 2015

(54) ANTENNA DEVICE AND WIRELESS COMMUNICATION DEVICE USING THE SAME

(71) Applicant: Wistron NeWeb Corporation, Hsinchu (TW)

(72) Inventors: Kai-Yang Cheng, Hsinchu (TW); Ming-Feng Chang, Hsinchu (TW); Chih-Ming Wang, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 354 days.

(21) Appl. No.: 13/772,361

(22) Filed: Feb. 21, 2013

(65) Prior Publication Data

US 2014/0097992 A1    Apr. 10, 2014

(30) Foreign Application Priority Data

Oct. 9, 2012  (TW) .............................. 101137317 A

(51) Int. Cl.
*H01Q 1/24* (2006.01)
*H01Q 1/22* (2006.01)
*H01Q 13/10* (2006.01)

(52) U.S. Cl.
CPC ............. *H01Q 1/243* (2013.01); *H01Q 1/2266* (2013.01); *H01Q 13/10* (2013.01)

(58) Field of Classification Search
CPC ...... H01Q 1/243; H01Q 13/10; H01Q 1/2266
USPC .................................................. 343/702, 841
See application file for complete search history.

(56) References Cited

U.S. PATENT DOCUMENTS

| 6,486,834 | B2 * | 11/2002 | Tsai ............................. 343/702 |
| 6,861,989 | B2 * | 3/2005 | Morningstar et al. ........ 343/702 |
| 6,977,808 | B2 * | 12/2005 | Lam et al. ................ 361/679.24 |
| 7,339,530 | B2 | 3/2008 | Ying |
| 8,253,634 | B2 * | 8/2012 | Ohguchi et al. .............. 343/702 |
| 8,604,995 | B2 * | 12/2013 | Hammad ...................... 343/841 |
| 2001/0034242 | A1 * | 10/2001 | Takagi ........................ 455/550 |
| 2014/0292613 | A1 * | 10/2014 | Hsiao et al. .................. 343/905 |

FOREIGN PATENT DOCUMENTS

| CN | 1853310 A | 10/2006 |
| TW | 201212384 | 3/2012 |

* cited by examiner

*Primary Examiner* — Tho G Phan
(74) *Attorney, Agent, or Firm* — Winston Hsu; Scott Margo

(57) ABSTRACT

An antenna device utilized in a wireless communication device having a lid, a chassis and a hinge is disclosed. The antenna device includes a radiating module disposed in the lid or the hinge and moving in response to movement of the lid, for transmitting or receiving radio-frequency signals; and a metal barricade disposed in an area apart from the radiating module by a specified distance on the chassis.

16 Claims, 12 Drawing Sheets

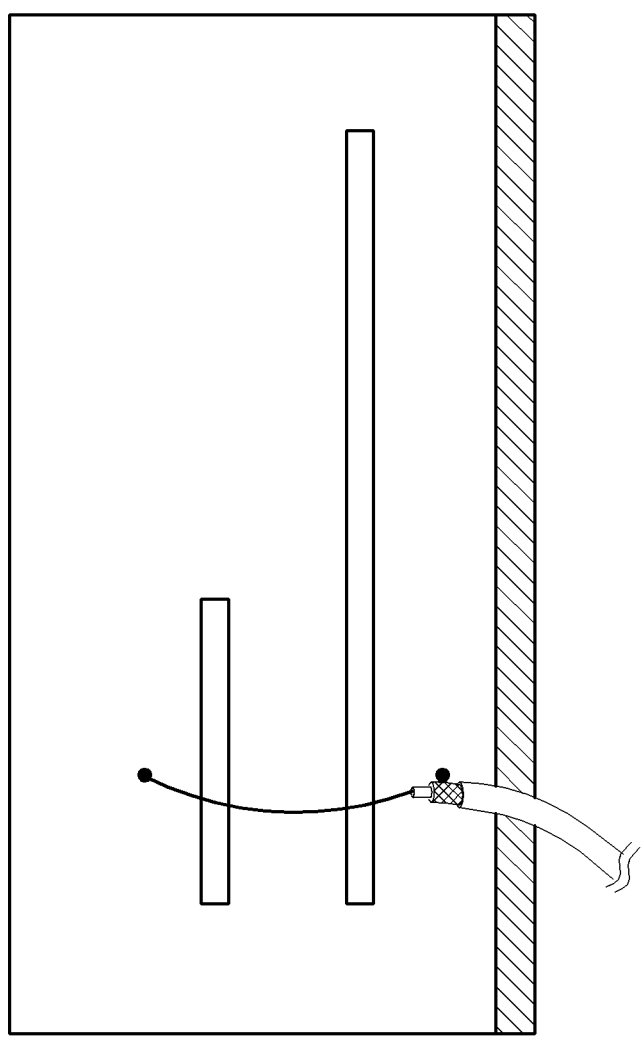

ANTENNA DEVICE AND WIRELESS COMMUNICATION DEVICE USING THE SAME

BACKGROUND OF THE INVENTION

1. Field of the Invention

The present invention relates to an antenna device and a wireless communication device, and more particularly, to an antenna device and a wireless communication device capable of adaptively switching radiation patterns and adjusting directions of radiated power, so as to satisfy wireless communication requirements for different operating modes.

2. Description of the Prior Art

Electronic products with wireless communication functionalities, e.g. laptops, tablet PCs, etc., utilize antennas to emit and receive radio waves for transmitting or exchanging radio signals, so as to access wireless network. Therefore, in order to facilitate a user's access to a wireless communication network, different antennas have been developed in the prior art to increase as much bandwidth as possible within a permitted range while minimizing physical dimensions. However, conventional antenna designs are usually optimized only for a fixed operating state. When the operating state is not fixed, good antenna characteristics may not be obtained for each operating state.

For example, a laptop is substantially composed of a chassis and a lid. The chassis comprises a mainframe, and the lid comprises a screen. In general, an antenna of the laptop is designed based on an operating environment after a user unfolds the lid. When the user folds the lid and executes certain network functions (e.g. downloading files and data, or executing network program computing), or when a laptop is switched to a tablet PC operating mode by a special hinge in certain applications, the operating environment of the laptop switches to a lid-folded mode. In such a condition, since the housing of the laptop is made of metal or carbon fiber and is not designed for the lid-folded operating environment, the radiating efficiency may be affected due to shielding effect when network functions are executed with the lid folded. To improve such a problem, plastic or a material with non-shielding effect is adopted on the housing of the laptop corresponding to the position of the antenna. As a result, the appearance design is affected, and the production and manufacturing cost is further increased.

Therefore, it is a common goal in the industry to maintain radiation efficiency of each operating mode for a wireless communication application operating at multiple modes.

SUMMARY OF THE INVENTION

It is therefore an objective of the present invention to provide an antenna device and a wireless communication device capable of maintaining the radiating efficiency for multiple operating modes.

An embodiment of the present invention discloses an antenna device for a wireless communication device comprising a lid, a chassis and a hinge connecting to the lid and the chassis to allow the lid to be folded and unfolded in relation to the chassis. The antenna device comprises a radiating module, disposed in the lid or the hinge, and moving in response to movement of the lid, for transmitting or receiving a radio-frequency signal; and a metal barricade, disposed in an area apart from the radiating module by a specified distance on the chassis.

An embodiment of the present invention further discloses a wireless communication device, comprising a lid; a chassis; a hinge, connecting to the lid and the chassis, to allow the lid to be folded and unfolded in relation to the chassis; an antenna device, comprising a radiating module, disposed in the lid or the hinge, and moving in response to movement of the lid, for transmitting or receiving a radio-frequency signal; and a metal barricade, disposed in an area apart from the radiating module by a specified distance on the chassis.

Another embodiment of the present invention further discloses an antenna device for a wireless communication device, comprising a radiating module, disposed in the wireless communication device, for transmitting or receiving a radio-frequency signal; and a metal barricade, disposed in an area apart from the radiating module by a specified distance on the wireless communication device.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3A to 3C are schematic diagrams of three different types of slot antennas applied to an antenna device shown in FIG. 1.

DETAILED DESCRIPTION

Figure 1:
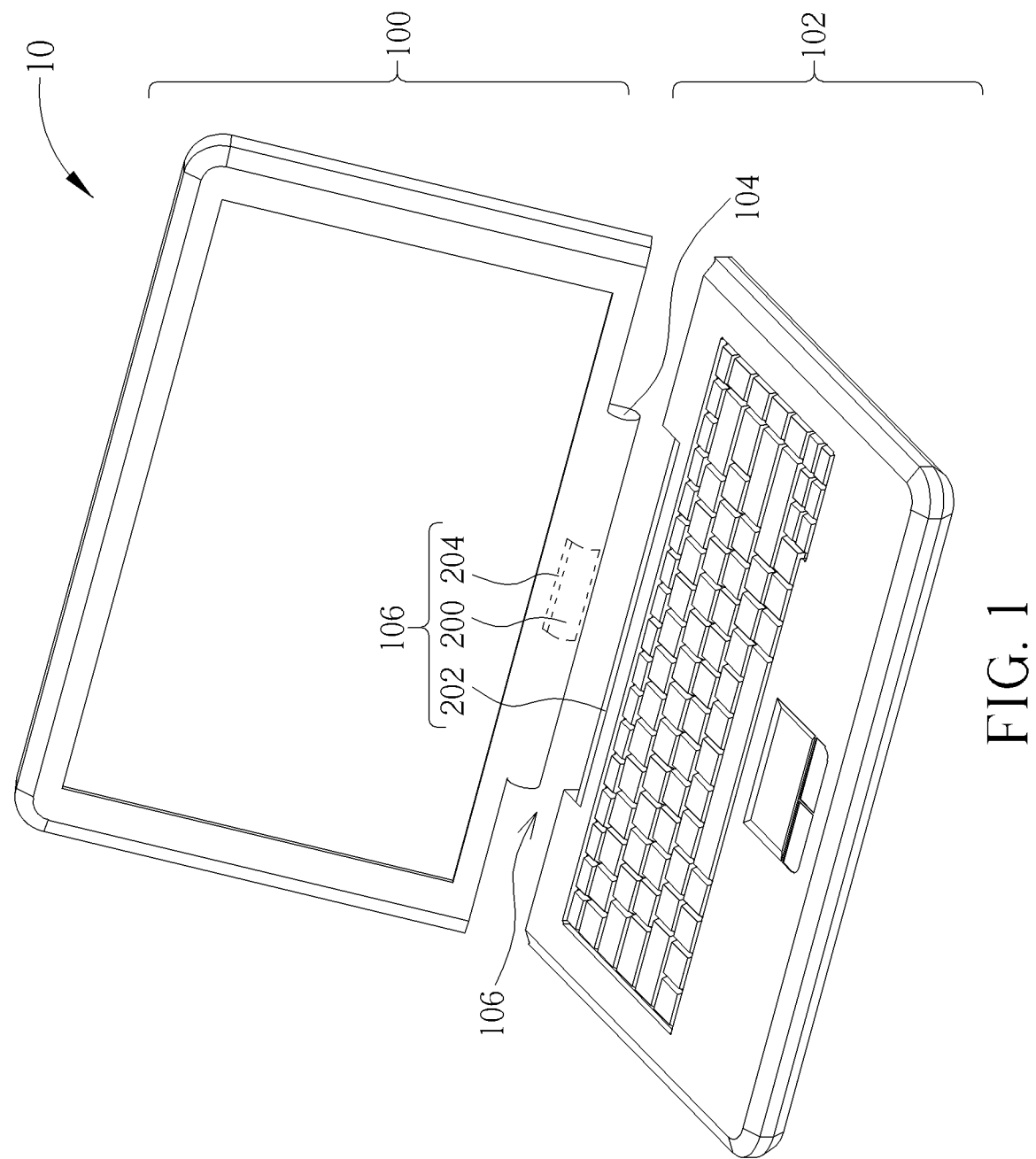
FIG. 1 is a schematic diagram of a laptop according to an embodiment of the present invention.

Please refer to FIG. 1, which is a schematic diagram of a laptop 10 according to an embodiment of the present invention. The laptop 10 includes a lid 100, a chassis 102, a hinge 104 and an antenna device 106. The lid 100 includes a screen, a camera, etc. The chassis 102 includes a keyboard, a touch pad, a mainframe, an extension interface, and so on. The lid 100 and the chassis 102 are connected by the hinge 104 to allow the lid 100 to be folded and unfolded in relation to the chassis 102. The antenna device 106 includes a radiating module 200, a metal barricade 202 and a metal connector 204. The radiating module 200 and the metal connector 204 are disposed on the hinge 104, while the metal barricade 202 is disposed in the chassis 102. Such a disposition is an example of the present invention, and should not be limited thereto. The antenna device 106 is capable of adaptively switching a pattern direction according to an operating mode of the laptop 10, to ensure normal operation of the wireless communication.

Figure 2A:
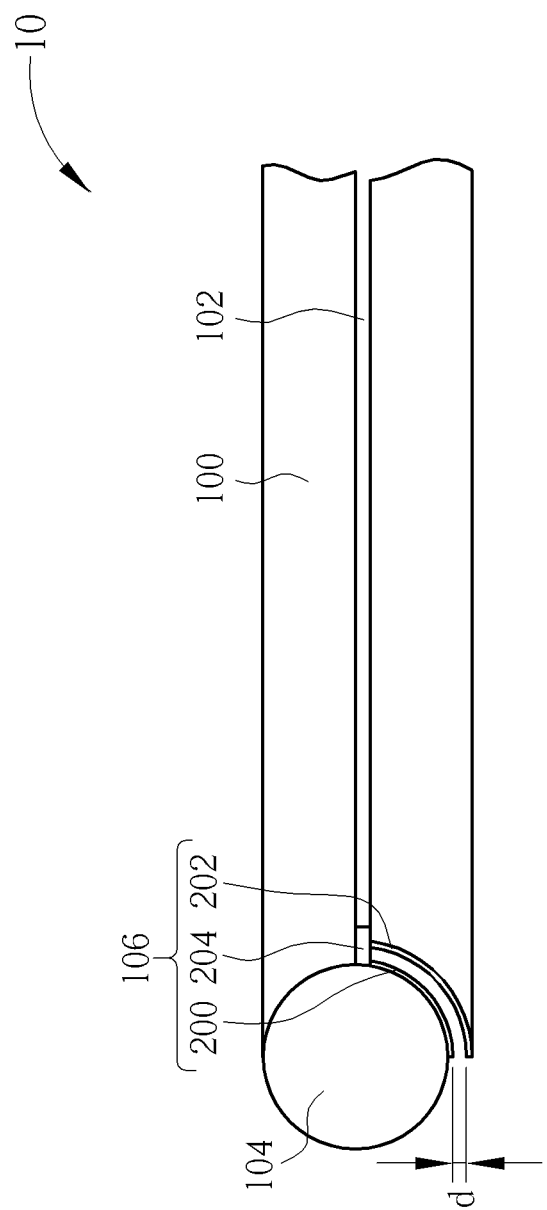
FIG. 2A is a cross-sectional diagram of an antenna device when a lid of the laptop shown in FIG. 1 is folded.
Figure 2B:
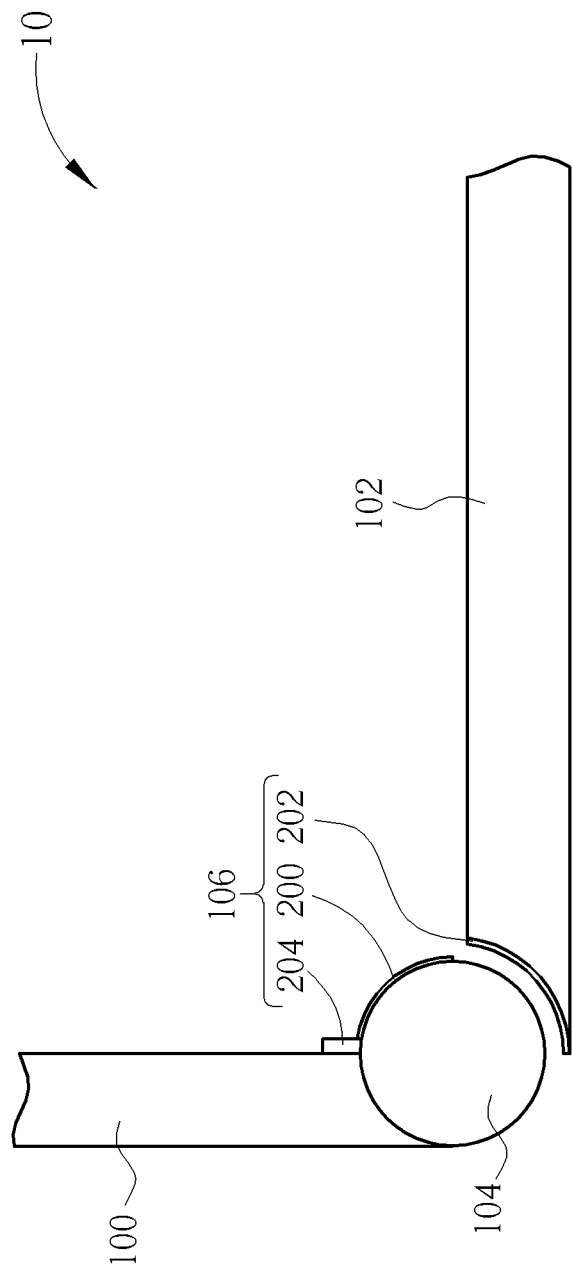
FIG. 2B is a cross-sectional diagram of an antenna device when a lid of the laptop shown in FIG. 1 is unfolded.

In detail, please continue referring to FIGS. 2A and 2B, which are cross-sectional diagrams of the antenna device 106 when the lid 100 of the laptop 10 is folded and unfolded, respectively. As shown in FIGS. 2A and 2B, the radiating module 200 is disposed in the hinge 104 and moves in response to movement of the lid 100, for transmitting or receiving radio-frequency signals. The metal barricade 202 is coupled to a system ground terminal of the laptop 10, and is disposed in an area apart from the radiating module 200 by a distance d on the chassis 102. In this example, the metal connector 204 is disposed in the lid 100 and electrically connected to the radiating module 200, for electrically connecting the radiating module 200 and metal barricade 202 by metal connecting when the lid 100 is folded, and disconnecting the radiating module 200 and the metal barricade 202 when the lid 100 is unfolded. In short, the distance between the metal barricade 202 and the radiating module 200 is the distance d. When the lid 100 is folded (i.e. an angle between the lid 100 and the chassis 102 is substantially equal to 0), the metal connector 204 contacts the metal barricade 202, such that the metal barricade 202 and the radiating module 200 are electrically connected. On the contrary, when the lid 100 is unfolded (i.e. the angle between the lid 100 and the chassis 102 is greater than 0), the metal connector 204 does not contact the metal barricade 202, to disconnect the electrical connection between the metal barricade 202 and the radiating module 200.

Therefore, the radiating module 200 and the metal barricade 202 are substantially in parallel, i.e. projection results of the radiating module 200 and the metal barricade 202 on a vertical plane are substantially overlapped, such that the metal barricade 202 may be seen as a reflector or a part of a planar antenna, which increases backward radiation (from the metal barricade 202 to the radiating module 200) of the chassis 102. Different from the reflector or the planar antenna, the metal barricade 202 and the radiating module 200 are connected by the metal connector 204, such that low-frequency characteristics of the radiating module 200 are enhanced by grounding of the metal barricade 202. As can be seen, when the lid 100 is folded, even if the lid 100 is made of materials with shielding effect such as metal or carbon fiber, or the lid 100 does not consist of a plastic window, the laptop 10 still maintains normal wireless communication functionalities because the metal barricade 202 directs radiated power to the backside of the chassis 102.

On the other hand, when the lid 100 is unfolded, the radiating module 200 and the metal barricade 202 are disconnected, such that the radiated power is mainly emitted toward a vertical direction of the radiating module 200. Since the lid 100 has been unfolded, the radiated power of the radiating module 200 emits toward the vertical direction without shielding.

As can be seen, according to operating environments of the laptop 10, the antenna device 106 is capable of adaptively switching the radiation pattern and adjusting the direction of radiating power, so as to maintain a normal operation when the lid 100 is unfolded and increase the radiation efficiency when the lid 100 is folded, to satisfy wireless communication requirements for different operating modes.

Noticeably, FIGS. 1 and 2A, 2B are diagrams according to embodiments of the present invention, and those skilled in the art can make modifications or alterations accordingly. For example, the laptop 10 is for illustrating the concept of the present invention, and is not restricted to the above-mentioned. Wireless communication devices capable of executing wireless communication functionalities are adapted to the present invention with moderate modifications according to the application scope. For example, if an applied wireless communication device is a tablet PC, an antenna in the tablet PC can be designed according to the disposition of the antenna device 106 when the lid 100 of the laptop 10 is folded as shown in FIG. 2A, i.e. to add a metal barricade and electrically connect the radiating module and the metal barricade by a metal connector, so as to direct the radiated power to a specific direction, and prevent shielding effects from a screen or a housing. The skills of applying the example of FIG. 2A to tablet PCs should be well-known for those skilled in the art.

Figure 3B:
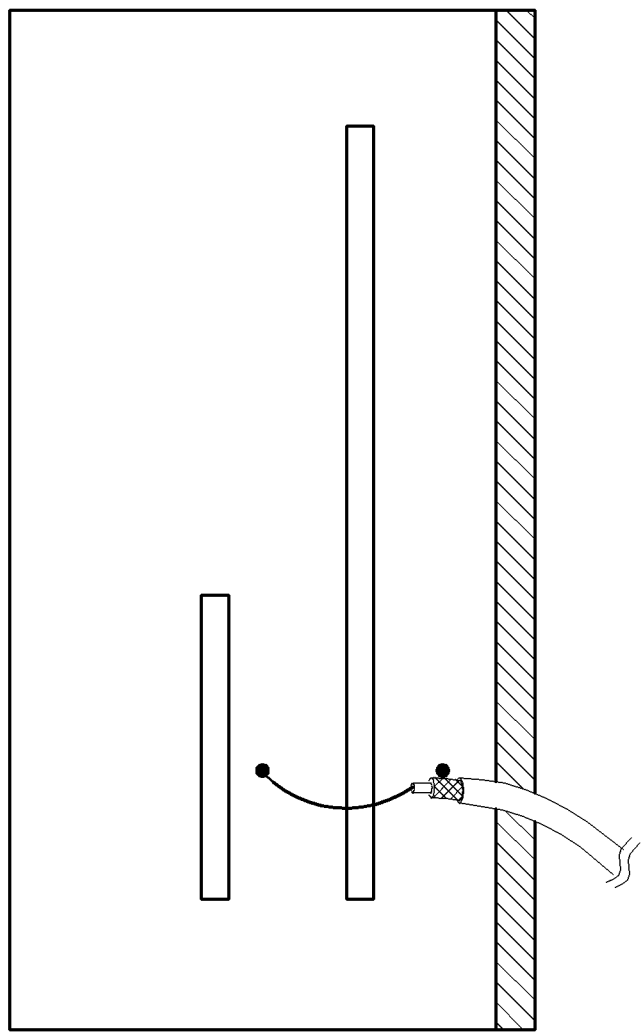
Figure 3C:
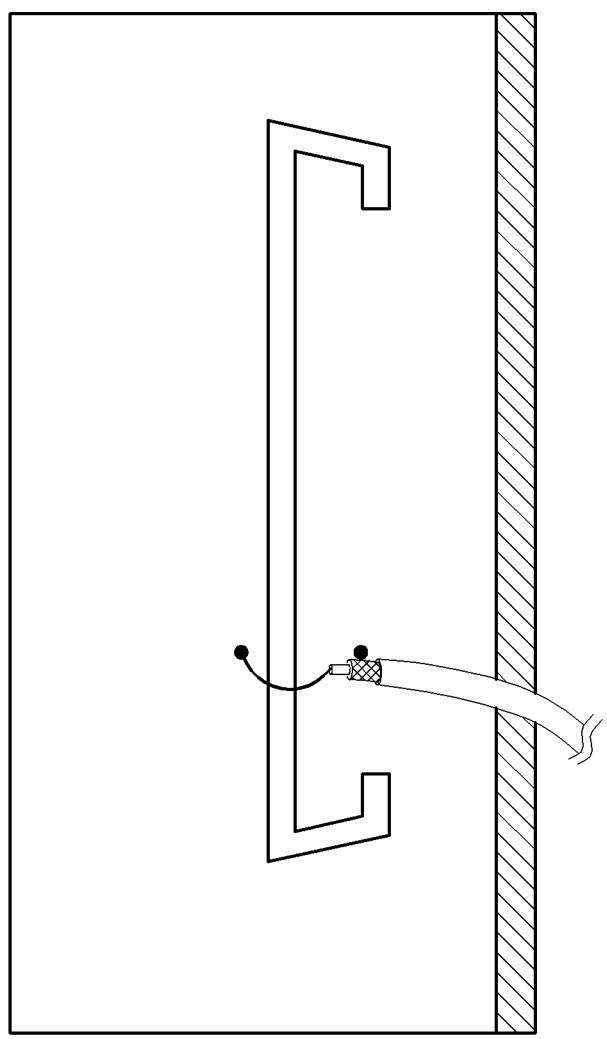
Figure 4:
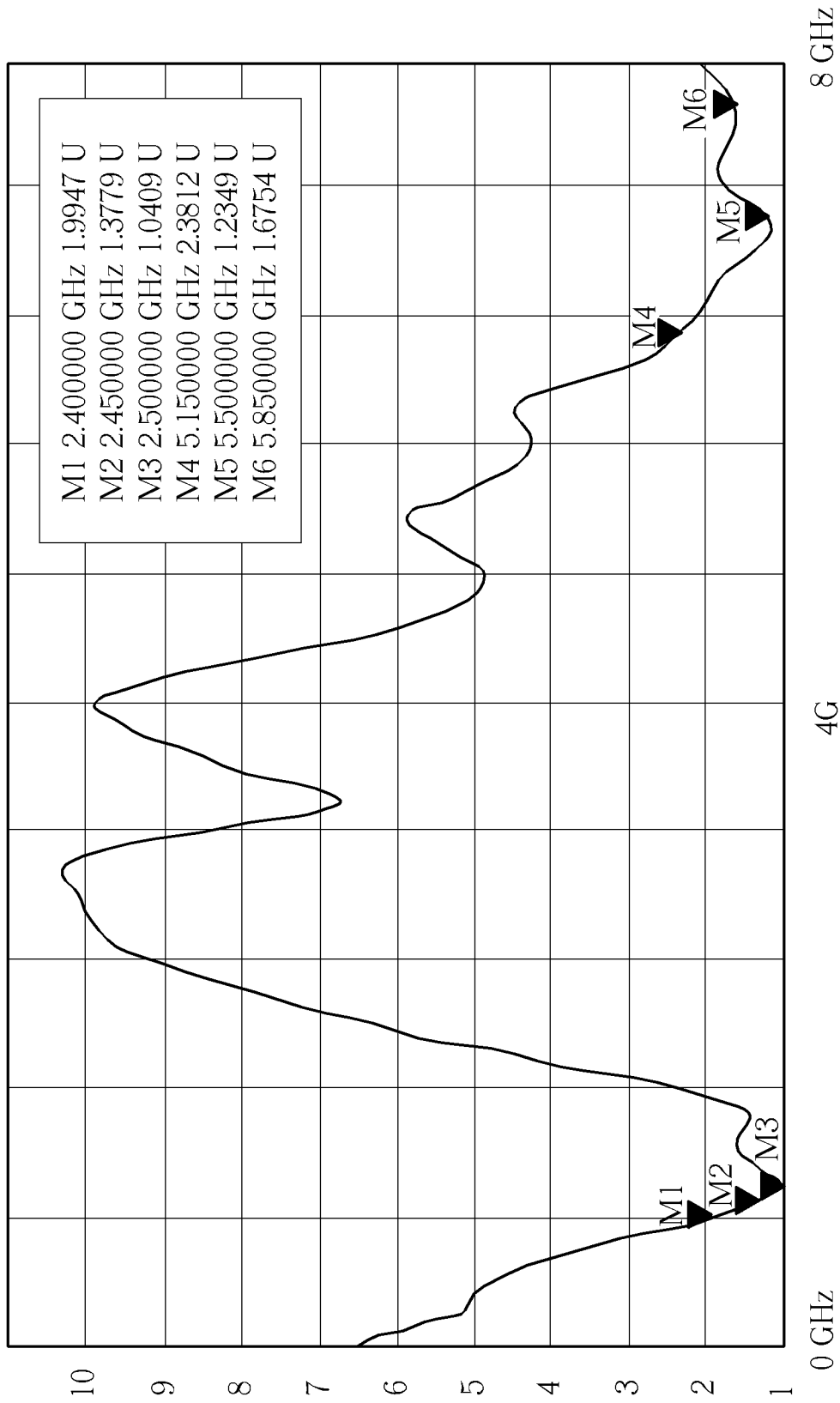
FIG. 4 is a diagram of voltage standing wave ratio (VSWR) related to an antenna device shown in FIG. 1.
Figure 5A:
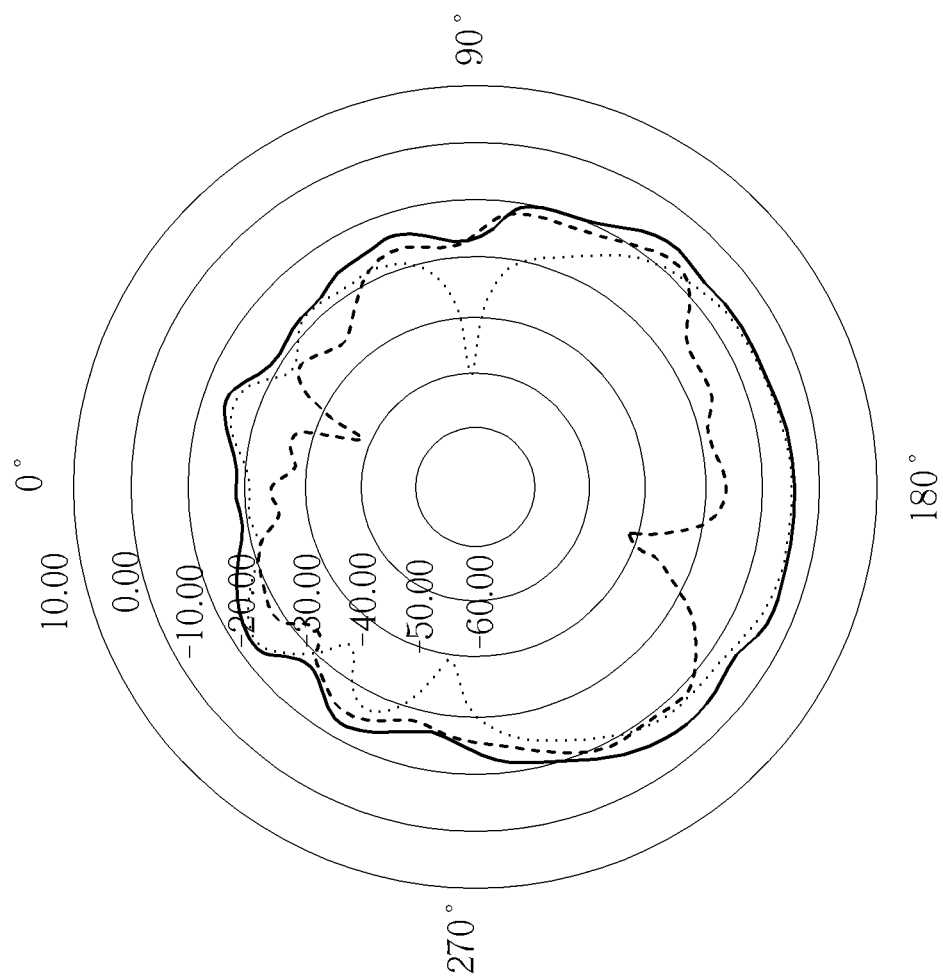
FIGS. 5A, 5B, 6A and 6B are diagrams of radiation patterns related to an antenna device shown in FIG. 1 for different operating frequencies.
Figure 5B:
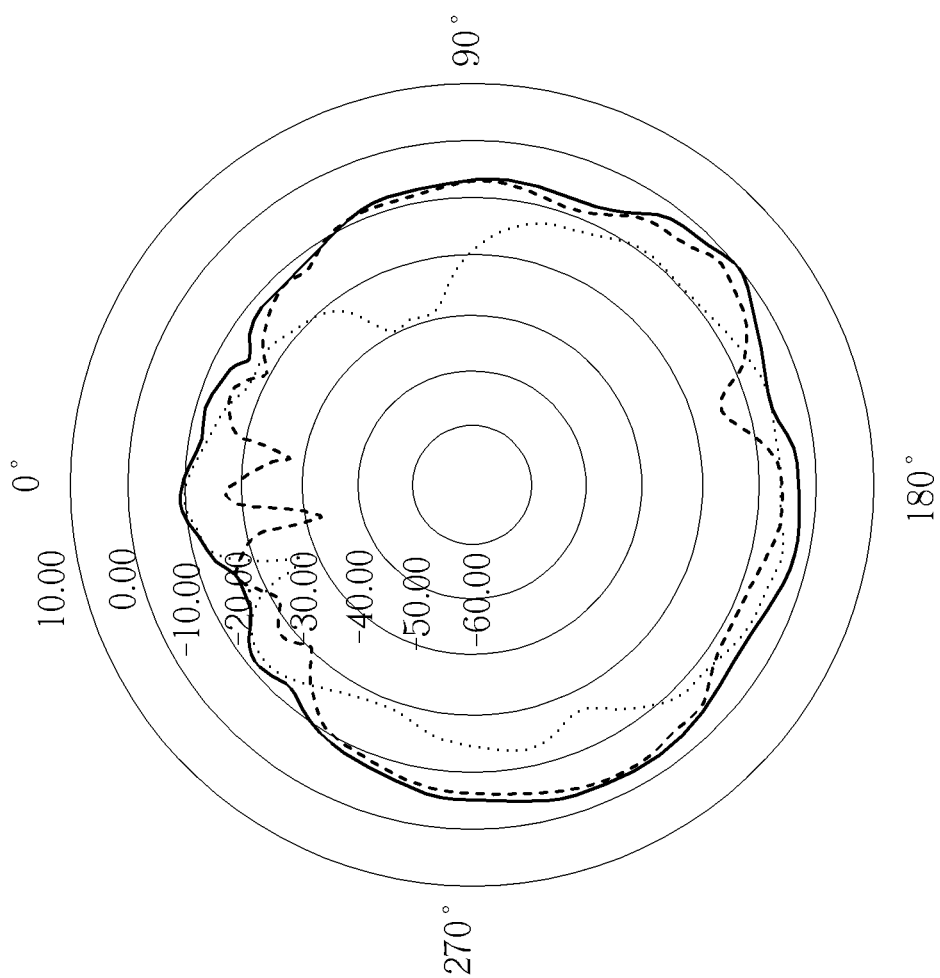
Figure 6A:
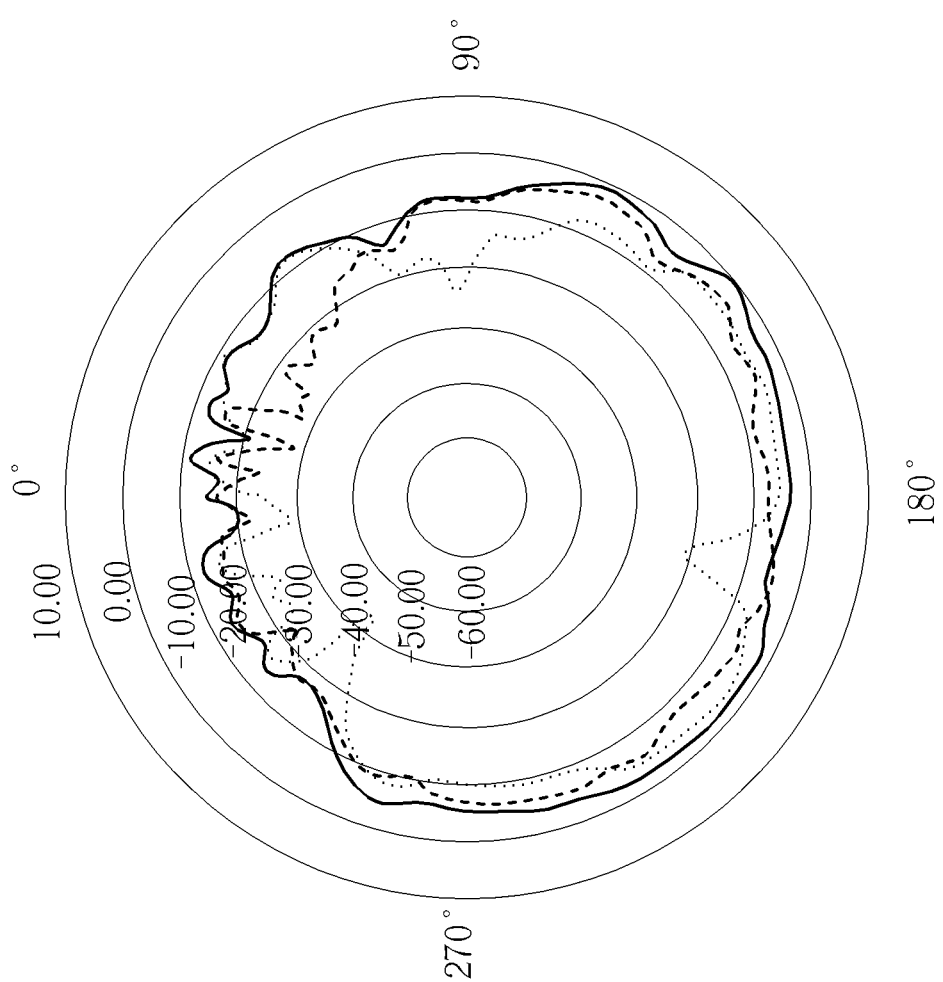
Figure 6B:
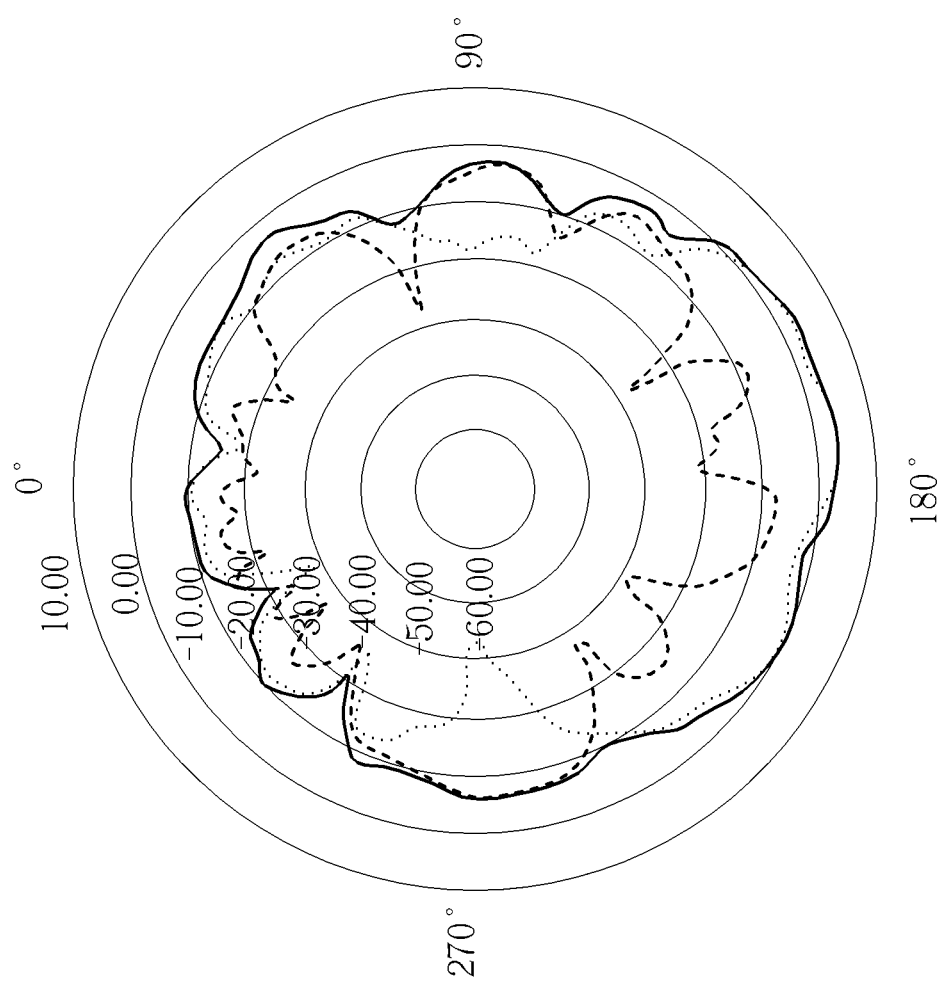

In the antenna device 106, the radiating module 200 is a radiating portion, and may be a slot antenna, a planar inverted-F antenna, etc., and is not restricted thereto. Designers may select proper antenna types and adjust the antenna area, dimension, material, disposing method, and position according to system requirements. For example, in an embodiment, the radiating module 200 may be a planar antenna; however, if the area in the hinge 104 for disposing the radiating module 200 is ladder-like, the radiating module 200 may also be set in a stepped manner, which should be a well-known skill for those skilled in the art. Besides, please refer to FIGS. 3A to 3C. FIGS. 3A to 3C are three different types of slot antennas, including a horn-like slot or two parallel slots by etching and cutting. If the radiating module 200 is designed as the slot antennas shown in FIGS. 3A to 3C, a diagram of voltage standing wave ratio (VSWR) shown in FIG. 4 can be obtained by moderately adjusting the antenna area, dimension, etc. Furthermore, effectiveness of the metal barricade 202 can be derived by measuring the radiation pattern. For example, FIG. 5A is a diagram of radiation patterns at 2.442 GHz and obtained by keeping the testing condition of FIG. 4 and removing the metal barricade 202, FIG. 5B is a diagram of radiation patterns at 2.442 GHz and obtained by keeping the testing condition of FIG. 4 and including the metal barricade 202, FIG. 6A is a diagram of radiation patterns at 5.47 GHz and obtained by keeping the testing condition of FIG. 4 and removing the metal barricade 202, and FIG. 6B is a diagram of radiation patterns at 5.47 GHz and obtained by keeping the testing condition of FIG. 4 and including the metal barricade 202. In FIGS. 5A to 6B, dash lines denote horizontal radiation patterns, dotted lines denote vertical radiation patterns, and solid lines denote radiation patterns of global coverage. As can be seen from FIGS. 4 to 6A, 6B, the antenna device 106 achieves effective bandwidth near 2.4 GHz and 5 GHz, and the radiated power is directed to a specific direction by adding the metal barricade 202. Accordingly, wireless communication requirements for different operating modes are satisfied.

Figure 7:
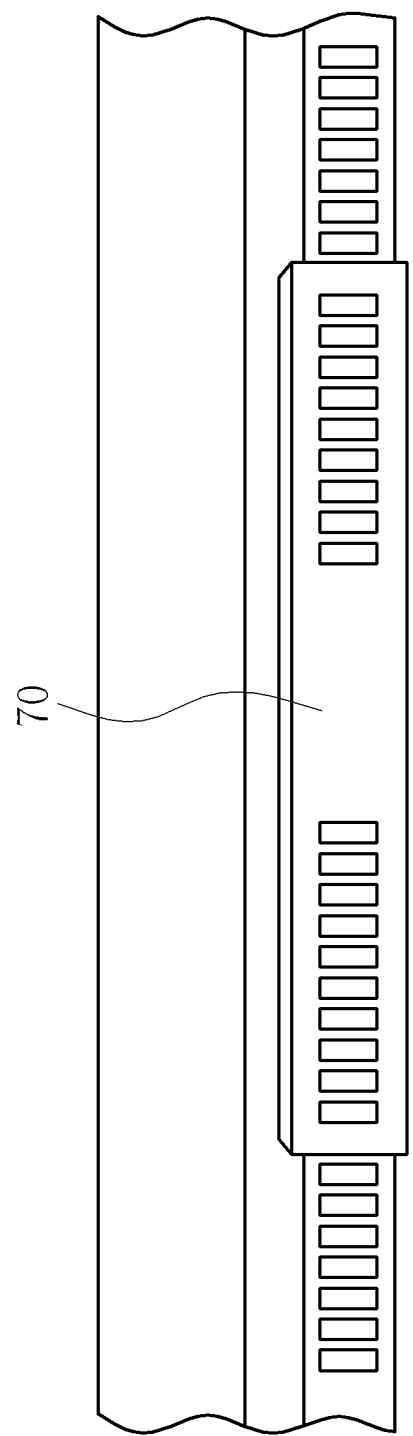
FIG. 7 is a schematic diagram of a metal barricade according to an embodiment of the present invention.

In addition, in the antenna device 106, the metal barricade 202 may be a single metal sheet or a combination of multiple metal sheets, and the shape, dimension, material, etc. may be adjusted to comply with appearance design or other requirements. For example, FIG. 7 is a schematic diagram of a metal barricade 70 according to an embodiment of the present invention. The metal barricade 70 can realize the metal barricade 202 in the antenna device 10, and includes multiple slots (drilled through) for heat dissipation of the system. On the other hand, the metal barricade 202 is associated with the radiating module 200 to adjust the radiation direction or pattern of the radiating module 200. In order to achieve adjusting the radiation direction or pattern of the radiating module 200, the shape, dimension, material, etc. of the metal barricade 202 may be adjusted, or a disposing method of the radiating module 200, such as disposing angle and direction, may also be adjusted. In other words, the disposing method of the radiating module 200 is related to the position of the metal barricade 202.

Moreover, in the antenna device 106, the metal connector 204 is mainly utilized for connecting the radiating module 200 and the metal barricade 202 to enhance radiating effectiveness of the radiating module 200 when the lid 100 is folded. However, the metal connector 204 may be removed in certain embodiments, i.e. the radiating module 200 and the metal barricade 202 maintain the same relation in position, for example, to be substantially overlapped or not overlapped, according to system application requirements.

Besides, implementation of the metal connector 204 is not limited. For example, the metal connector 204 is not limited to being disposed on the lid 100 and fixed to electrically connect to the radiating module 200. In other embodiments, the metal connector 204 may be disposed on the chassis 102 and fixed to electrically connect to the metal barricade 202. In other words, the metal connector 204 starts to electrically connect to the radiating module 200 by metal connecting after the lid 100 is folded. Besides, the metal connector 204 may also be made of materials or elements with elasticity or cushioning, such as a spring, a conductive foam, etc. In such a condition, when the metal connector 204 starts to electrically connect the lid 100 and the metal barricade 202, the angle between the lid 100 and the metal barricade 202 may be greater than 0 degrees, such as 5 degrees, 10 degrees, etc. That is, taking the 5 degrees as an example, when the angle between the lid 100 and the metal barricade 202 is smaller than 5 degrees, the metal connector 204 with elasticity may start to electrically connect the lid 100 and the metal barricade 202, and allows the lid 100 to entirely attach to the metal barricade 202 (i.e. the angle between the two is 0 degrees) by the elasticity without affecting the folding of the lid 100.

In addition, in the laptop 10, the lid 100, the chassis 102 and the hinge 104 are distinguished by structures. In practice, the hinge 104 in certain applications may be an extension of the lid 100 or the chassis 10 (such as a retainer, a hook, etc.), or a structure independent of the lid 100 and the chassis 102. In such a condition, the radiating module 200 may be disposed in the lid 100 instead of the hinge 104. As long as the radiating module 200 is capable of moving in response to movement of the lid 100, the radiating module 200 may be disposed in the lid 100, inside the hinge 104, outside the hinge 104, or independent of the lid 100 and the hinge 104.

Furthermore, as shown in FIG. 1, the hinge 104 is extended from the bottom side of the center of the lid 100, and is not restricted thereto. The hinge 104 may also include two sub-hinges respectively disposing under two edges of the lid 100, which is within the scope of the present invention.

In the prior art, an antenna is designed and optimized only for a fixed operating state. When the operating state is not fixed, good antenna characteristics may not be obtained for each operating state. In comparison, the present invention can adaptively switch the radiation pattern of the antenna device and adjust the emitting direction of radiating power according to operating environments of the laptop, so as to maintain a normal operation when the lid is unfolded and increase the radiation efficiency when the lid is folded, to satisfy wireless communication requirements for different operating modes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An antenna device for a wireless communication device comprising a lid, a chassis and a hinge connecting to the lid and the chassis to allow the lid to be folded and unfolded in relation to the chassis, the antenna device comprising:
   a radiating module, disposed in the lid or the hinge, and moving in response to movement of the lid, for transmitting or receiving a radio-frequency signal;
   a metal barricade, disposed in an area apart from the radiating module by a specified distance on the chassis; and
   a metal connector, for electrically connecting the radiating module and the metal barricade according to an angle between the lid and the chassis;
   wherein the metal connector disconnects the radiating module and the metal barricade when the angle between the lid and the chassis is greater than a predefined value, and electrically connects the radiating module and the metal barricade when the angle between the lid and the chassis is smaller than or equal to the predefined value.

2. The antenna device of claim 1, wherein projection results of the lid and the chassis on a vertical plane are substantially overlapped when the angle between the lid and the chassis is smaller than or equal to the predefined value.

3. The antenna device of claim 1, wherein the metal connector is disposed on the lid and electrically connected to the radiating module, and the metal connector electrically connects to the metal barricade by metal connecting when the angle between the lid and the chassis is smaller than or equal to the predefined value.

4. The antenna device of claim 1, wherein the metal connector is disposed on the chassis and electrically connected to the metal barricade, and the metal connector electrically connects to the radiating module by metal connecting when the angle between the lid and the chassis is smaller than or equal to the predefined value.

5. The antenna device of claim 1, wherein the radiating module comprises a metal sheet, on which a slot is formed or the radiating module complies with a planar inverted-F antenna.

6. The antenna device of claim 1, wherein a plurality of slots is formed on the metal barricade.

7. The antenna device of claim 1, wherein the metal barricade is further coupled to a ground terminal of the wireless communication device.

8. The antenna device of claim 1, wherein a disposing method of disposing the radiating module in the lid or the hinge is related to a position of the metal barricade in the chassis.

9. A wireless communication device, comprising:
   a lid;
   a chassis;
   a hinge, connecting to the lid and the chassis, to allow the lid to be folded and unfolded in relation to the chassis; and
   an antenna device, comprising:
     a radiating module, disposed in the lid or the hinge, and moving in response to movement of the lid, for transmitting or receiving a radio-frequency signal;
     a metal barricade, disposed in an area apart from the radiating module by a specified distance on the chassis; and
     a metal connector, for electrically connecting the radiating module and the metal barricade according to an angle between the lid and the chassis;
   wherein the metal connector disconnects the radiating module and the metal barricade when the angle between the lid and the chassis is greater than a predefined value, and electrically connects the radiating module and the metal barricade when the angle between the lid and the chassis is smaller than or equal to the predefined value.

10. The wireless communication device of claim 9, wherein projection results of the lid and the chassis on a vertical plane are substantially overlapped when the angle between the lid and the chassis is smaller than or equal to the predefined value.

11. The wireless communication device of claim 9, wherein the metal connector is disposed on the lid and electrically connected to the radiating module, and the metal connector electrically connects to the metal barricade by metal connecting when the angle between the lid and the chassis is smaller than or equal to the predefined value.

12. The wireless communication device of claim 9, wherein the metal connector is disposed on the chassis and electrically connected to the metal barricade, and the metal connector electrically connects to the radiating module by metal connecting when the angle between the lid and the chassis is smaller than or equal to the predefined value.

13. The wireless communication device of claim 9, wherein the radiating module comprises a metal sheet, on which a slot is formed or the radiating module complies with a planar inverted-F antenna.

14. The wireless communication device of claim 9, wherein a plurality of slots is formed on the metal barricade.

15. The wireless communication device of claim 9, wherein the metal barricade is further coupled to a ground terminal of the wireless communication device.

16. The wireless communication device of claim 9, wherein a disposing method of disposing the radiating module in the lid or the hinge is related to a position of the metal barricade in the chassis.

\* \* \* \* \*